Nov. 17, 1959   T. G. TOMMERVIK   2,913,238
WEIGHING SCALE
Filed Oct. 24, 1955   3 Sheets-Sheet 1

Traverse G. Tommervik
INVENTOR.

BY *Clarence A. O'Brien*
*and Harvey B. Jackson*
Attorneys

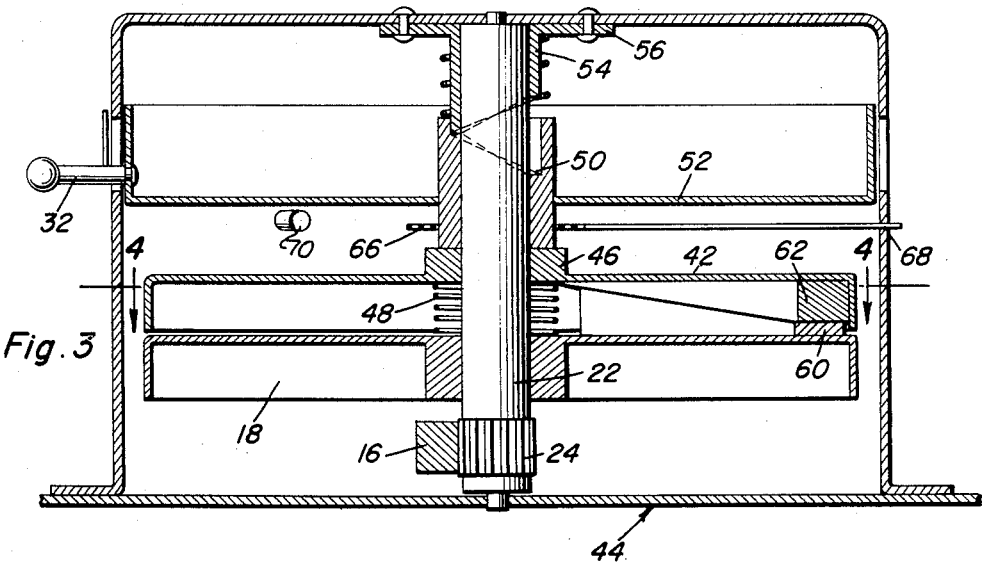
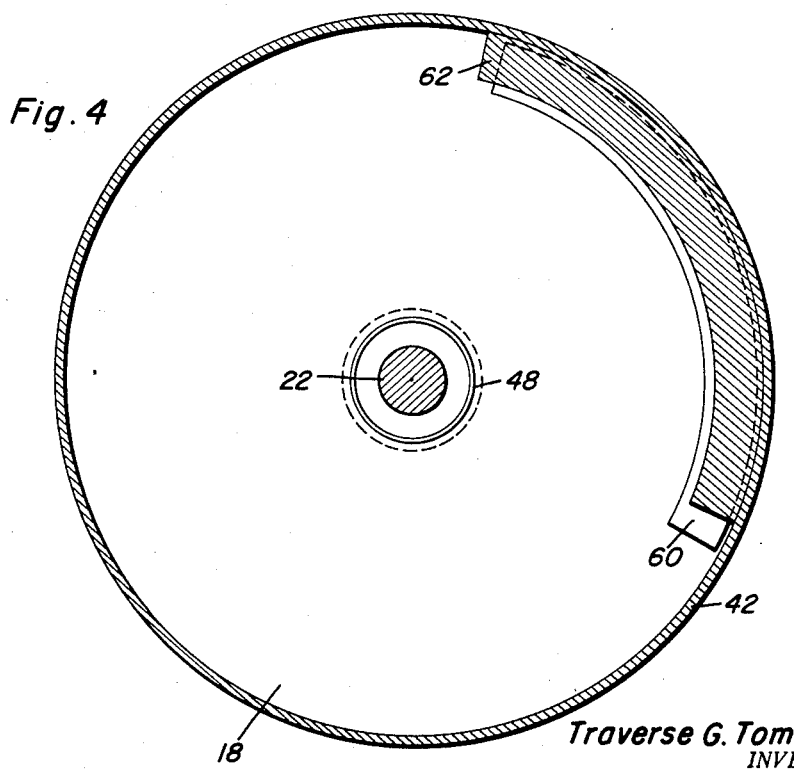

Nov. 17, 1959    T. G. TOMMERVIK    2,913,238
WEIGHING SCALE
Filed Oct. 24, 1955    3 Sheets-Sheet 3

Traverse G. Tommervik
INVENTOR.

United States Patent Office 2,913,238
Patented Nov. 17, 1959

2,913,238

WEIGHING SCALE

Traverse G. Tommervik, Gary, Minn.

Application October 24, 1955, Serial No. 542,310

8 Claims. (Cl. 265—68)

This invention relates to improvements in weighing scales.

An object of this invention is to provide a weighing scale primarily, but not exclusively, useful by individuals, the scales having means for indicating the overweight of the persons using the scales, this means being adjustable to suit the person using the scales by a single manipulation.

Another object of this invention is to provide a weighing scale of the type which includes a rotary indicator, with a graduated member which registers the number of pounds overweight of an individual, regardless of the individual's weight, within practical limits.

Another object of the invention is to provide a weighing scale as aforesaid and which is constructed with a high degree of simplicity, it being intended to serve the function of indicating overweight by the inclusion of a graduated member and means which renders this member operative in response to actuation of the rotary indicator at a preselected point.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a weighing scale having the principles of the invention incorporated therein;

Figure 2 is a fragmentary plan view showing the indicator, means of adjusting the overweight scale so that the latter becomes operative beyond the preset point, Figure 2 being a slightly modified version of Figure 1 in that the graduations of the overweight scale are spaced farther than the graduations of the actual weight scale, this being possible by having a conventional motion multiplication means in the weighing scales (not shown and the specific construction thereof forming no part of the invention);

Figure 3 is a transverse sectional view of the part of the weighing scale embodying the principles of the invention;

Figure 4 is a transverse sectional view taken on the line 4—4 of Figure 3;

Figure 1:
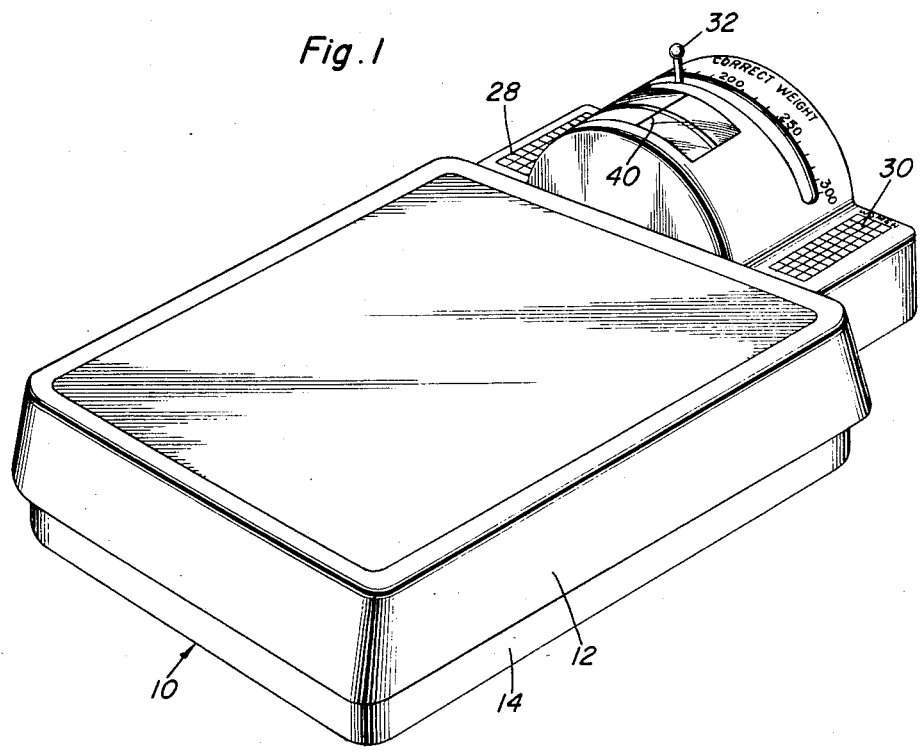

A weighing scale 10 is provided as the means on which the principles of the invention are demonstrated. This weighing scale is of the ordinary "bathroom" type having a platform 12 disposed on a base 14 and arranged with a weighing structure, usually of the balanced beam type, whereby upon stepping on platform 12, the rack 16 which is connected to the weighing structure, is moved in an amount proportional to the weight of the individual on the scales. Many of these scales customarily have a weight indicator 18 in the form of a disk on whose periphery graduations 20 are formed in pounds in order to indicate actual weight. Generally, such an indicator is secured to a shaft 22 on which pinion 24 is fixed, the pinion being engaged with rack 16, whereby motion of the rack 16 is transferred to indicator 18 through the pinion 24 and shaft 22, indicator 18 being fixed to shaft 22 by suitable means, as a setscrew 26.

To this structure, the invention adds means for automatically indicating overweight of the individual using the scales. These means operate in this fashion: After ascertaining what the individual's correct weight should be, for example, by reference to the ladies' and men's charts 28 and 30, the handle 32 is moved until its pointer comes into registry with a number representing the correct weight of the person. Then, when that person steps on the scales, his actual weight is indicated. As indicator 18 begins to pass the weight selected by handle 32, the graduated member which functions as an overweight indicating member together with its graduations 38 begin to move in unison with the indicator 18. In one embodiment of the invention, both actual weight and overweight may be read simultaneously under the single hair line 40.

Figure 2:
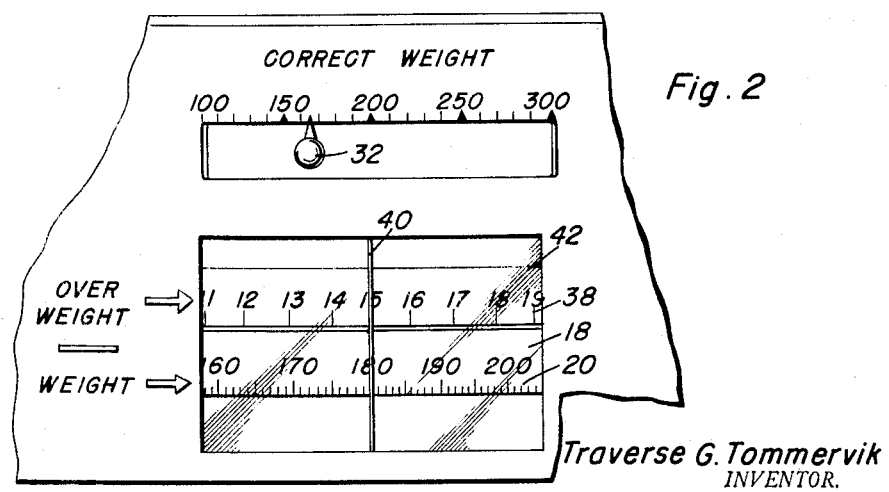

The structure of Figures 3–6 is capable of functioning in the manner described above. However, the graduations on the overweight indicating member must be arranged so that they are spaced the same distance as the graduations 20 on indicator 18. As an alternative, Figure 2 shows a weighing scale which has a standard and known type of deflection multiplying means (not shown) directly responsive to the weight being measured. In this way, the magnitude of rotation of indicator 18 is multiplied before it is reflected as rotation of the member 42.

Supporting structure 44 (Figures 3–6) is a part of the base 14 of the weighing scale 10. Supporting structure 44 is suitably shaped to accommodate the scales, rack, pinion, shaft 22 and indicator 18. Graduated member 42 is preferably annular and has a hub 46 through which shaft 22 extends. The graduated member 42 is slidable axially on shaft 22, and a light spring 48, concentric with shaft 22, bears against one surface of member 42 and the actual weight indicator 18. This spring 48 constantly spreads the indicator 18 and member 42 by a small force that is sufficient to overcome the weight of the graduated member 42.

Handle 32 is secured to a cam 50, the latter being concentrically disposed on shaft 22. An intermediate annular member 52 may be used for connecting the handle 32 to the cam 50, this being a matter of expediency and selection. A complemental cam 54 is fixed to structure 44 and is in contact with cam 50. One method of constructing cam 54 is to use a short sleeve in the bore of which shaft 22 is rotatable and having a flange 56 which is riveted or otherwise fixed to a wall of structure 44. Spring 58 reacts on the flange 56 and end of cam 50, being used to stabilize the cam 50. Spring 58 is lighter than spring 48 and does not interfere with the function of spring 48 which is to keep indicator 18 and graduated member 42 spaced.

Figure 5:
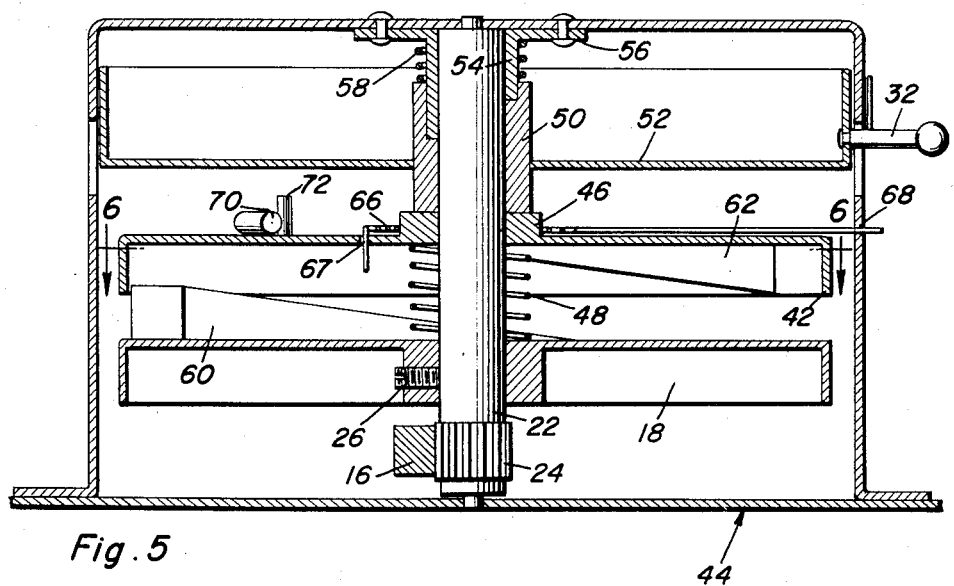
Figure 5 is a longitudinal sectional view similar to that of Figure 3 with the parts being in a different adjustment.
Figure 6:
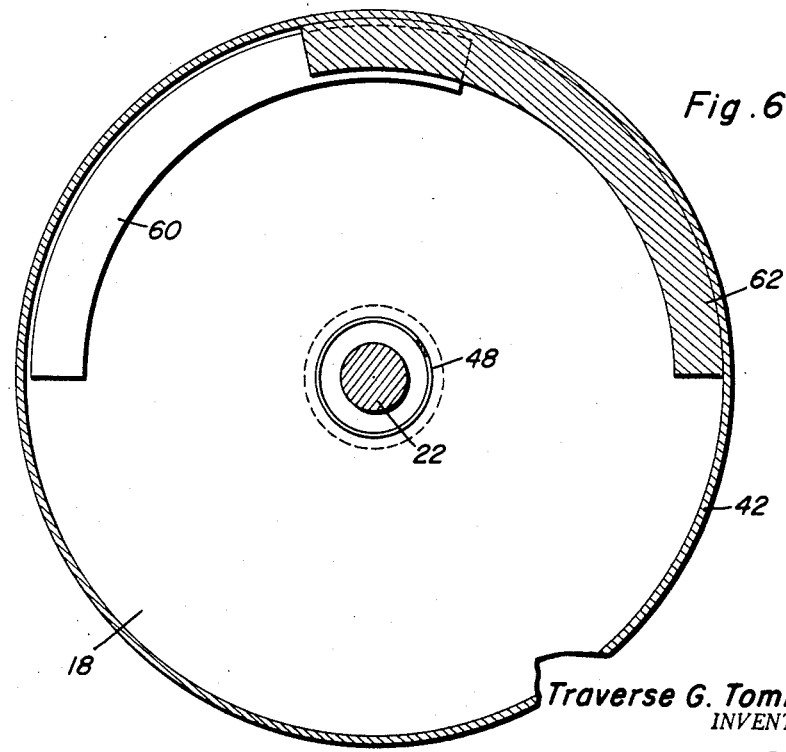
Figure 6 is a transverse sectional view taken on the line 6—6 of Figure 5 and illustrating the relationship of clutch elements in one adjusted position of parts, as in Figure 5.

A clutch element 60 is secured to the upper surface of indicator 18 and is movable therewith. A complemental clutch element 62 is secured to the lower surface of the graduated member 42 and is movable therewith. These clutch elements are adapted to be brought into contact with each other so that the graduated member 42 derives its motion from the rotation of indicator 18. The preferred, but not exclusive, configuration of clutch elements 60 and 62 is illustrated in Figures 3 and 5. The clutch elements are in the form of wedge-like cams.

Means for opposing rotation of the graduated member 42 in one direction and for returning the same, are provided. Preferably, the means consist of a spring 66 secured at one end 67 to the graduated member 42, as by being passed through an aperture therein. The opposite end of spring 66 is secured to structure 44, as at 68, where the opposite end of the spring is passed through a small aperture in structure 44. A stop 70 on the structure 44 and in the path of travel of pin 72 carried by graduated member 42, limits the return of graduated member 42 to the zero position.

In operation, the movement of handle 32 in order to select the correct weight of the individual, causes the cam 50 to be rotated on the shaft 22. Movement of this handle on cam 54 displaces the cam 50 so that it slides the graduated member 42 on shaft 22 in order to assume a position on shaft 22 spaced from indicator 18 as amount proportional to the selected correct weight.

Inasmuch as the shaft 22 rotates the moment that an individual steps on the platform 12, the indicator 18 also rotates. Therefore, cam element 60 rotates freely with indicator 18 until such time that it contacts clutch element 62. Then, indicator 18 and graduated member 42 move in unison. By setting the cam 50 through actuation of handle 32, the point in rotation of indicator 18 at which it becomes coupled with graduated member 42 through the clutch elements 60 and 62 may be selected. This point corresponds to the correct weight of the individual using the scales. When the individual removes his weight from the platform 12, the indicator 18 is returned to the zero position by motion of the rack 16, and the graduated member 42 is returned to the zero position by the action of spring 66.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention as claimed.

What is claimed as new is as follows:

1. In a weighing scale which includes a supporting structure having a shaft to which a weight indicator is attached, means mounted on said shaft and operatively connected with said indicator for showing the difference between the indicated weight and a preselected weight, said means including a graduated member, a clutch element secured to said member, a clutch element secured to said indicator and engageable by the element on said graduated member in response to actuation of said indicator beyond a predetermined amount, and adjustable means to select the required extent of movement of said weight indicator to have said clutch elements come into contact.

2. A weighing scale comprising a shaft, means responsive to weight load for rotating said shaft, an actual weight indicator secured to said shaft and rotatable therewith, a graduated member slidable on said shaft, a spring disposed on said shaft and yieldingly holding said member and said indicator spaced from each other, generally wedge-shaped clutch elements secured respectively to said indicator and said member and in confronting relationship to each other so that upon rotation of said indicator, said graduated member is correspondingly rotated when said clutch elements come into contact with each other, and means operatively connected with said graduated member for manually adjusting the distance between said indicator and said member in order to adjust the point of rotation of said indicator at which said clutch elements are brought into driving engagement with each other.

3. A weighing scale comprising a shaft, means responsive to weight load for rotating said shaft, an actual weight indicator secured to said shaft and rotatable therewith, a graduated member slidable on said shaft, a spring disposed on said shaft and yieldingly holding said member and said indicator spaced from each other, generally wedge-shaped clutch elements secured respectively to said indicator and said member and in confronting relationship to each other so that upon rotation of said indicator, said graduated member is correspondingly rotated when said clutch elements come into contact with each other, means operatively connected with said graduated member for manually adjusting the distance between said indicator and said member in order to adjust the point of rotation of said indicator at which said clutch elements are brought into driving engagement with each other, said adjusting means comprising a stationary cam, a movable cam disposed on said shaft and rotatable on said stationary cam to slide said movable cam axially on said shaft, and said movable cam being in contact with said graduated member to move it axially of said shaft.

4. The combination of claim 3 together with a spring reacting on said movable cam to stabilize said movable cam.

5. The combination of claim 3 together with a return spring secured to and reacting on said indicator member in order to return said indicating member to a zero position.

6. The combination of claim 3 and a stop operatively connected with said graduated member to limit the movement of said graduated member in one direction.

7. The combination of claim 3 wherein said graduated member is arranged to indicate overweight in pounds, and the last mentioned means having a scale connected therewith arranged to indicate desired weight of a person.

8. In a weighing scale, a supporting structure, a shaft mounted for rotation in said supporting structure, means to rotate said shaft in response and in direct proportion to the weight load to be weighed, an actual weight indicator secured to said shaft and rotatable therewith, an overweight indicator member mounted for rotation on said shaft, means for coupling said indicator and said member together for rotation as a unit at a point in the rotative travel of said indicator beyond which coupling exists, means calibrated as the desired weight of an individual for displacing said member toward and away from said indicator so that said member is rendered operative at the selected position of rotation of said indicator in order to reflect the true difference between the desired weight and actual weight of an individual.

References Cited in the file of this patent

UNITED STATES PATENTS

| | | |
|---|---|---|
| 1,174,337 | Messiter | Mar. 7, 1916 |
| 1,407,987 | Crane | Feb. 28, 1922 |
| 1,547,890 | Atteberry | July 28, 1925 |
| 1,623,820 | West | Apr. 5, 1927 |
| 1,628,781 | Jaenichen | May 17, 1927 |
| 2,085,345 | Tuttle et al. | June 29, 1937 |
| 2,308,874 | Greenleaf | Jan. 19, 1943 |